United States Patent
Tanaka

(10) Patent No.: US 7,363,709 B2
(45) Date of Patent: Apr. 29, 2008

(54) WHEEL AND METHOD OF MANUFACTURING THE SAME

(75) Inventor: Takeshi Tanaka, Higashiosaka (JP)

(73) Assignee: Work Co., Ltd., Higashiosaka-shi (JP)

( * ) Notice: Subject to any disclaimer, the term of this patent is extended or adjusted under 35 U.S.C. 154(b) by 273 days.

(21) Appl. No.: 11/110,741

(22) Filed: Apr. 21, 2005

(65) Prior Publication Data
US 2005/0241740 A1    Nov. 3, 2005

(30) Foreign Application Priority Data
Apr. 28, 2004 (JP) .............................. 2004-133968

(51) Int. Cl.
*B21K 1/38* (2006.01)
(52) U.S. Cl. .......................... 29/894.353; 29/894.323; 72/85
(58) Field of Classification Search ........... 29/894.351, 29/352, 353, 354, 323; 301/69; 72/85, 91
See application file for complete search history.

(56) References Cited

U.S. PATENT DOCUMENTS

| | | | | |
|---|---|---|---|---|
| 4,050,135 A | * | 9/1977 | Luedi ..................... | 29/894.353 |
| 5,533,261 A | * | 7/1996 | Kemmerer ............. | 29/894.322 |
| 5,579,578 A | * | 12/1996 | Ashley, Jr. ............. | 29/894.322 |
| 5,740,609 A | * | 4/1998 | Jurus ..................... | 29/894.324 |
| 5,832,608 A | * | 11/1998 | Pollkotter .............. | 29/894.324 |
| 6,571,590 B1 | * | 6/2003 | Friese ........................... | 72/85 |
| 6,757,976 B2 | * | 7/2004 | Baek ..................... | 29/894.322 |
| 6,935,024 B2 | * | 8/2005 | Shimizu ................ | 29/894.353 |
| 2004/0016124 A1 | * | 1/2004 | Guimard ................ | 29/894.354 |
| 2005/0034305 A1 | * | 2/2005 | Meyer ................... | 29/894.351 |
| 2005/0097749 A1 | * | 5/2005 | Beyer .................... | 29/894.351 |

* cited by examiner

*Primary Examiner*—David P. Bryant
*Assistant Examiner*—Alexander P Taousakis
(74) *Attorney, Agent, or Firm*—Kratz, Quintos & Hanson, LLP

(57) ABSTRACT

The present invention provides a wheel and manufacturing method of the same which make it possible to prevent the formation of indentations along the hump parts in the inner circumferential surface of the rim. In a wheel which comprises a cylindrical rim consisting of a rolled metal plate, and in which hump parts that are used to lock the inner circumferential edge part of the tire are disposed circumferentially so that these hump parts protrude to the outside in the vicinity of the end part of the outer circumferential surface of the rim on at least the design surface side, the outer hump part is formed to have an increased thickness by damming so that this outer hump part protrudes outward while the inner circumferential surface of the rim that corresponds to the outer hump part is formed into a flat circumferential surface.

3 Claims, 6 Drawing Sheets

(a)

(b)

(c)

(d)

(a)

(b)

WHEEL AND METHOD OF MANUFACTURING THE SAME

BACKGROUND OF THE INVENTION

1. Field of the Invention

The present invention relates to a wheel and a method of manufacturing the same.

2. Description of the Related Art

One-piece type wheels which are integrally molded by casting, two-piece type wheels with a construction that is split into two parts, i. e., a rim and a disk, and three-piece type wheels with a construction that is split into three parts, i. e., an inner rim, and outer rim and a disk, are widely used as vehicle wheels that consist of light alloys such as aluminum alloys or the like.

In the case of two-piece type wheels and three-piece type wheels, wheels in which the disk is manufactured by casting or forging, and the rims are constructed using rolled metal plates have been adapted for practical use. Rims that are used in such cases include products in which band form rolled metal plates are rolled up into a cylindrical shape, both ends are welded, and the produced is molded into a desired shape by spinning, and products in which circular plate form rolled metal plates are press-molded into a cylindrical shape with a bottom, the bottom part is cut away, thus forming a cylindrical molded product, and this product is molded into a desired shape by spinning.

Furthermore, in the abovementioned vehicle wheels, in order to lock the inner circumferential edge part of the tire, hump parts that protrude outward are disposed circumferentially in the vicinity of both end parts of the rim, and rim flange parts that extend outward at an inclination in the radial direction are formed on both end parts of the rim (for example, see Japanese Patent Application Laid-Open No. 2003-236638). Furthermore, wheels in which at least the rim flange part on the design surface side is constructed with an increased thickness, folding this part back or curling this part into a cylindrical shape so that the strength and rigidity are increased, have also been adapted for practical use (for example, see Japanese Patent Application Laid-Open No. 2003-236638 and Japanese Patent Application Laid-Open No. 2003-236636).

Meanwhile, the requirements of users with respect to the design of wheels have become more diversified with each passing year, so that two-piece type wheels or three-piece type wheels that are superior in terms of productivity in the case of the manufacture of small amounts of diverse types have recently become more popular than one-piece type wheels that are superior in terms of mass production characteristics.

SUMMARY OF THE INVENTION

In the case of one-piece type wheels, the hump parts can be constructed so that these parts protrude outward in the circumferential direction while the inner circumferential surface of the rim is constructed as a flat circumferential surface in positions corresponding to the hump parts by constructing the hump parts with an increased thickness during casting. However, in the case of two-piece type wheels and three-piece type wheels, the following problem arises: namely, because the hump parts are formed by spinning, indentations that run along the hump parts are formed in the inner circumferential surface of the rim in positions corresponding to the hump parts, and these indentations are exposed on the design surface side of the wheel, so that there is a deterioration in the design characteristics of the wheel.

Furthermore, in the case of a one-piece type wheel, the strength can be increased by constructing the rim flange parts with an increased thickness during casting. However, in the case of two-piece type wheels and three-piece type wheels, since the strength of the rim flange parts is increased by folding back the rim end parts or curling the parts into a cylindrical shape, the plating liquid accumulates inside the folded-back parts or curls, thus causing corrosion to occur in the rim flange parts.

It is an object of the present invention to provide a wheel and a method of manufacturing the same which make it possible to construct the inner circumferential surface of the rim as a flat circumferential surface in positions corresponding to the hump part even in the case of two-piece type wheels or three-piece type wheels, and which also make it possible to improve the corrosion resistance of the rim flange parts by constructing the rim flange parts with an increased thickness by damming.

The wheel of the present invention is a wheel comprising a cylindrical rim consisting of a rolled metal plate, in which a hump part that is used to lock the inner circumferential edge part of the tire is disposed circumferentially so that this hump part protrudes outward on at least the vicinity of the end part of the design surface side of the outer circumferential surface of the rim, wherein the hump part is formed to have an increased thickness by damming so that this hump part protrudes outward while the inner circumferential surface of the rim corresponding to the hump part is formed into a flat circumferential surface.

In other words, since this wheel is a two-piece type or three-piece type wheel in which the rim is constructed from a rolled metal plate, production of small quantities of diverse types that meet the needs of consumers can be achieved more easily than in the case of one-piece type wheels in which the entire wheel is constructed as a cast product; furthermore, since the texture of the rim is a fine dense texture, a lustrous surface finish that is superior in terms of design characteristics can be obtained. Moreover, since the inner circumferential surface of the rim corresponding to the hump part on the design surface side is a flat circumferential surface, the formation of indentations in the inner circumferential surface of the rim corresponding to the hump part can be securely prevented, so that a deterioration in the design characteristics of the wheel due to the exposure of such indentations on the design surface side can be prevented.

Here, in a desirable example, at least the rim flange part on the design surface side, of the rim flange parts formed on both ends of the abovementioned rim is formed to have an increased thickness to a set size by damming.

The wheel manufacturing method of the present invention is a wheel manufacturing method comprising a pressing step in which a material plate consisting of a rolled metal plate is press-molded using a die and punch so that a primary molded product with a cylindrical shape having a bottom, which has a flange part that extends outward on one end part thereof, is manufactured, a cut-away step in which the bottom part of the primary molded product is cut away so that a cylindrical secondary molded product is manufactured, and a spinning step in which the secondary molded product is formed into a rim shape by means of a roller, wherein the flange part and vicinity thereof of the primary molded product are formed to have an increased thickness by damming during press-molding by using a die in which the curvature radius in the corner parts of the punch insertion side end part is set so that the plate thickness of the flange part and vicinity thereof in the primary molded product is 15 to 30% greater than the plate thickness of the material plate in the pressing step, and the secondary worked product is externally mounted on a mandrel so that the flange part is on the design surface side, and a hump molding roller is pressed against the increased-thickness portion of the secondary molded product to form the hump part, using a mandrel in which the outer circumferential surface corresponding to the hump part on at least the design surface side is formed into a flat circumferential surface, in the abovementioned spinning step.

In this manufacturing method, in the pressing step, a substantially circular disk form rolled metal plate can be molded into a primary molded product having a cylindrical shape with a bottom which has a flange part by deep drawing using a die and a punch. In this case, however, the rolled metal plate shows an overall contraction in diameter as a result of the central part being caused to protrude, so that the thickness of the outer circumferential part of the rolled metal plate is segregated in the circumferential direction along with this reduction in diameter, thus causing the flange part of the primary molded product to increase compared to the other parts. Furthermore, the plate thickness in the vicinity of the flange part of the primary molded product, i. e., in the curved part between the flange part and the body part and the base part of the body part on the side of the flange part, shows an increase in thickness caused by damming during press molding as the curvature radius in the corner part of the punch insertion side end part of the die is increased; accordingly, the curvature radius in these corner parts can be appropriately set, and the plate thickness in the vicinity of the flange part of the primary molded product can therefore be set at a value that is 15 to 30% greater than the plate thickness of the material plate. Thus, after the thickness of the flange part and area in the vicinity of the flange part is increased in the pressing step, the secondary molded product is externally mounted on a mandrel in which at least the outer circumferential surface corresponding to the hump part on the design surface side is formed into a flat circumferential surface in the subsequent spinning step, and a hump molding roller is pressed against the secondary worked product, so that a hump part is formed in which the rim inner circumferential surface side is formed into a flat circumferential surface.

Here, in a desirable example, the curvature radius in the corner parts of the end part on the abovementioned punch insertion side is set so that this curvature radius increases continuously or in stages toward the outer circumferential side of the corner parts, and a rim flange part is formed by pressing the flange molding roller against the end part of the flange part from the outside in the abovementioned spinning step.

In the wheel of the present invention, the inner circumferential surface of the rim corresponding to the hump part on the design surface side is constructed as a flat circumferential surface even in the case of a two-piece type or three-piece type wheel which allows the production of small quantities of diverse types; accordingly, a deterioration in the design characteristics of the wheel due to the formation of indentations in the inner circumferential surface of the rim corresponding to the hump part can be prevented.

Here, if at least the rim flange part on the design surface side (of the rim flange parts formed on both ends of the rim) is formed with a thickness that is increased to a set size by damming, the accumulation of the plating liquid inside the rim flange parts can be securely prevented, so that corrosion of the rim flange parts caused by such accumulation of the plating liquid can be securely prevented while the strength and rigidity of the rim flange parts are increased.

In the wheel manufacturing method of the present invention, the flange part and area in the vicinity of the flange part in the primary molded article can be set at a thickness that is 15 to 30% greater than the thickness of the material plate by damming in the pressing step using a simple method in which pressing is performed using a die in which the curvature radius in the corner parts of the end part on the punch insertion side is appropriately set; accordingly, in the spinning process, the hump part can be formed in a protruding shape so that no indentations are formed in the inner circumferential surface side of the rim, thus making it possible to prevent a deterioration in the design characteristics of the wheel caused by the formation of such indentations along the hump part in the inner circumferential surface of the rim corresponding to the hump part on the design surface side.

Here, if the curvature radius in the corner parts of the abovementioned end part on the punch insertion side is set so that this curvature radius increases continuously or in stages toward the outer circumferential side of the corner parts, the area in the vicinity of the flange part can easily be increased to a plate thickness that allows the formation of a hump.

Furthermore, as was described above, since the flange part is constructed with an increased thickness by damming, a rim flange part can be formed by pressing a flange molding roller "as is" against this increased-thickness portion from the outside in the spinning process, thus constructing the rim flange part with an increased thickness so that the strength and rigidity of the wheel are increased, and so at the same time the accumulation of the plating liquid inside the rim flange parts can be prevented when plating is performed, so that corrosion of the rim flange parts caused by such accumulation of the plating liquid can be securely prevented.

DESCRIPTION OF THE PREFERRED EMBODIMENTS

An embodiment of the present invention will be described below with reference to the attached figures.

Figure 1:
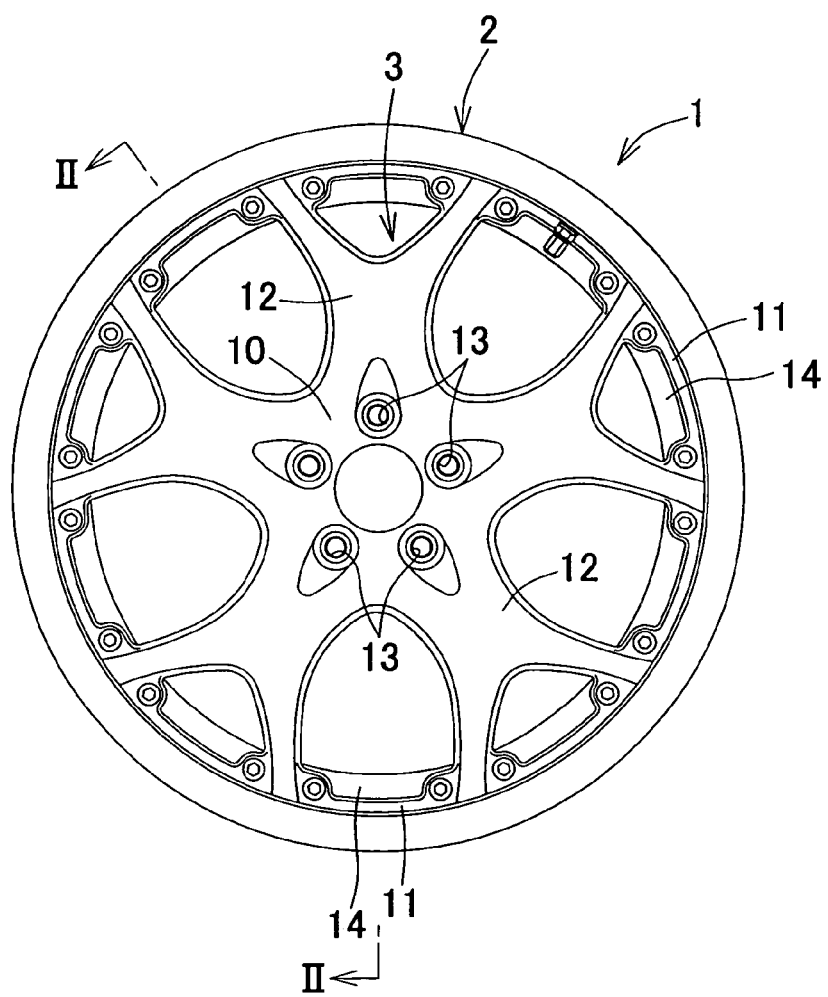
FIG. 1 is a first volume of a two-piece type wheel.
Figure 2:
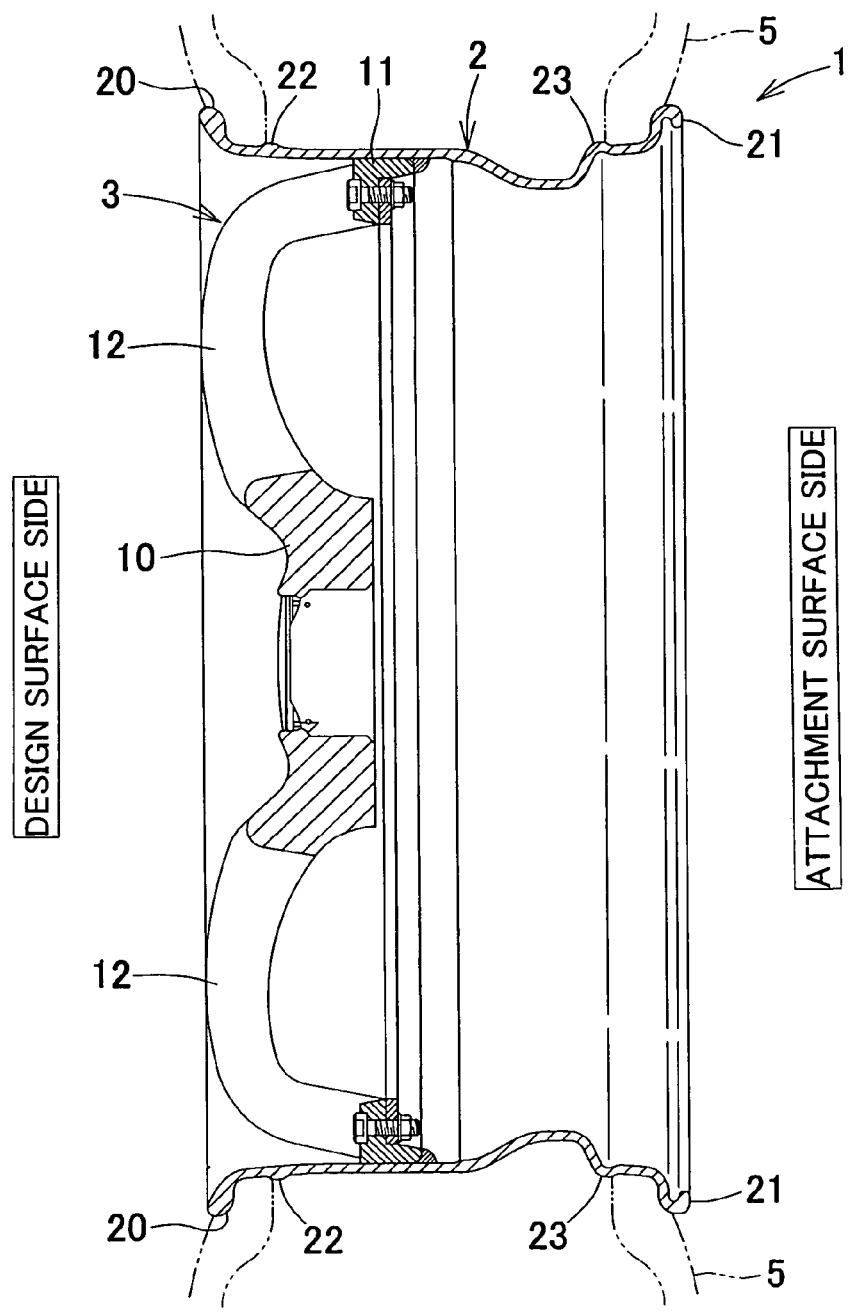
FIG. 2 is a sectional view along line II-II in FIG. 1.

As is shown in FIGS. 1 and 2, the vehicle wheel 1 is a two-piece type wheel, and comprises a substantially cylindrical rim 2, and a disk 3 which is disposed on the inside of the rim 2, and whose outer end part is fastened to the inner circumferential surface of the rim 2 by welding.

The disk 3 is molded as an integral unit by casting, press-molding, forging or the like using a light-weight metal material such as an aluminum alloy or the like, and comprises an attachment part 10 which is used to attach the disk to a wheel supporting member (not shown in the figures) disposed on the vehicle body side, an annular ring part 11 which is disposed so as to surround the attachment part 10, and spoke parts 12 that connect the attachment part 10 and ring part 11. The ring part 11 is fastened by welding to the inner circumferential surface of the rim 2, so that this ring part is assembled on the inside of the rim 2.

Five bolt passage holes 13 are formed in the attachment part 10 at fixed intervals in the circumferential direction on the circumference of a circle centered on the rotational center of the wheel 1 in positions corresponding to bolts (not shown in the figures) that are caused to protrude from the vehicle wheel supporting member. The tip end portions of the spoke parts 12 are formed in a bifurcated shape in order to enhance the design characteristics of the wheel 1, and are connected to the ring part 11. The number, shape and layout of these spoke parts 12 can be arbitrarily set with the design and strength of the wheel 1 being taken into account. It is not absolutely necessary that these spoke parts be formed with a bifurcated shape, and the number of spokes may be a number other than five. The ring part 11 is formed with a substantially L-shaped cross section, and a decorative plate 14 is attached to the attachment surface side of the ring part 11. The longitudinal sectional shape of the ring part 11 may be arbitrarily set. Furthermore, the decorative plate 14 is used merely to enhance the design characteristics of the wheel 1, and may be omitted.

The rim 2 is constructed from a metal material that is superior in terms of ductility such as an aluminum alloy or the like. An outer rim flange part 20 which is constructed with a greater thickness than the other parts is formed by damming on the design surface side end part of the rim 2, and an inner rim flange part 21 which is bent to the inside in substantially a U shape is formed on the attachment surface side of the rim 2.

An outer hump part 22 and inner hump part 23 which protrude outward in the radial direction are formed in the vicinity of both end parts of the rim 2 around the entire circumference of the rim 2. Both hump parts 22 and 23 and both rim flange parts 20 and 21 are respectively joined to the inner circumferential end of the tire 5, thus constructing the wheel so that the movement of the tire 5 in the direction of the rotational axis is restricted. The outer hump part 22 on the design surface side is formed so that this hump part protrudes by varying the thickness by means of damming, and the rim (2) inner circumferential side of the outer hump part 22 is formed into a flat circumferential surface. Furthermore, the inner hump part 23 on the attachment surface side is formed so that this hump part protrudes without causing any substantial variation in the thickness, and an indentation corresponding to the inner hump part 23 is formed in the rim (2) inner circumferential surface side of the inner hump part 23.

In this wheel 1, since no indentation is formed in the inner circumferential surface of the rim 2 corresponding to the outer hump part 22, the entire portion of the inner circumferential surface of the rim 2 that is exposed to the outside can be formed into a flat circumferential surface, so that the design characteristics of the wheel 1 can be enhanced while constructing the rim 2 from a rolled metal plate. Furthermore, the outer rim flange part 20 is constructed with an increased thickness by damming; accordingly, when the wheel 1 is subjected to a plating treatment, the accumulation of the plating liquid or the like inside the outer rim flange part 20 can be securely prevented, so that corrosion of the outer rim flange part 20 caused by such accumulation of the plating liquid can be prevented.

Next, the method used to manufacture the wheel 1 will be described.

Figure 3:
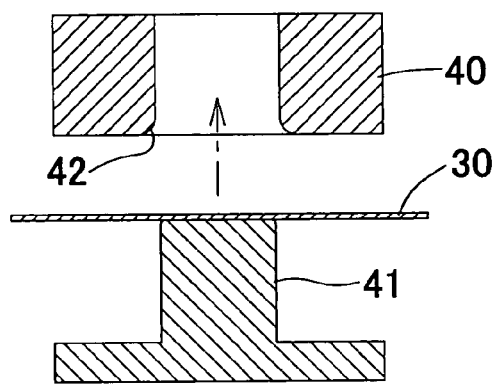
FIG. 3 is an explanatory diagram of the wheel manufacturing method.
Figure 3:
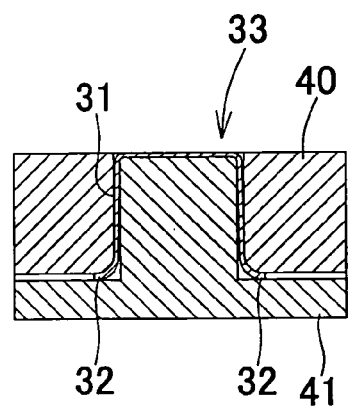
Figure 3:
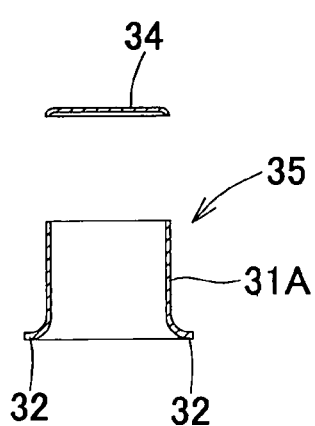
Figure 3:
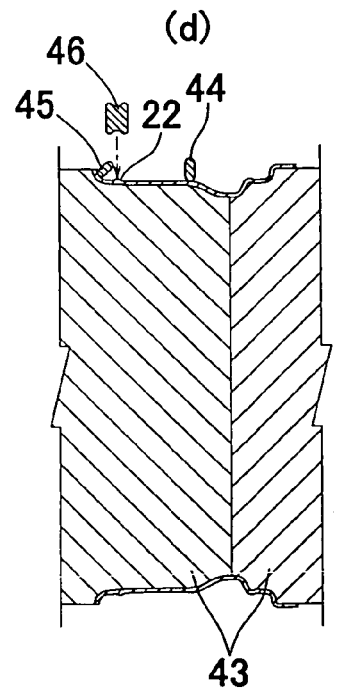
Figure 4:
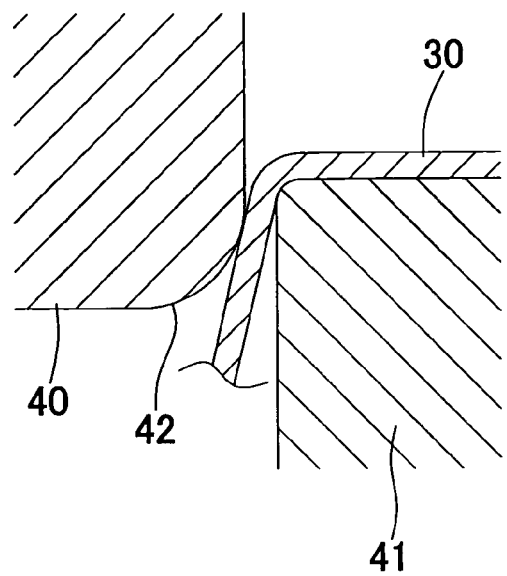
FIG. 4 is an explanatory diagram of the pressing step.
Figure 4:
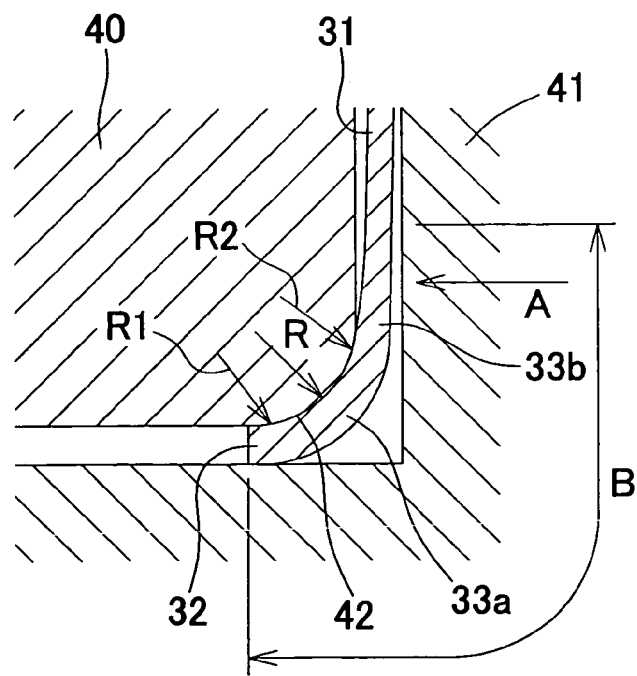
Figure 5:
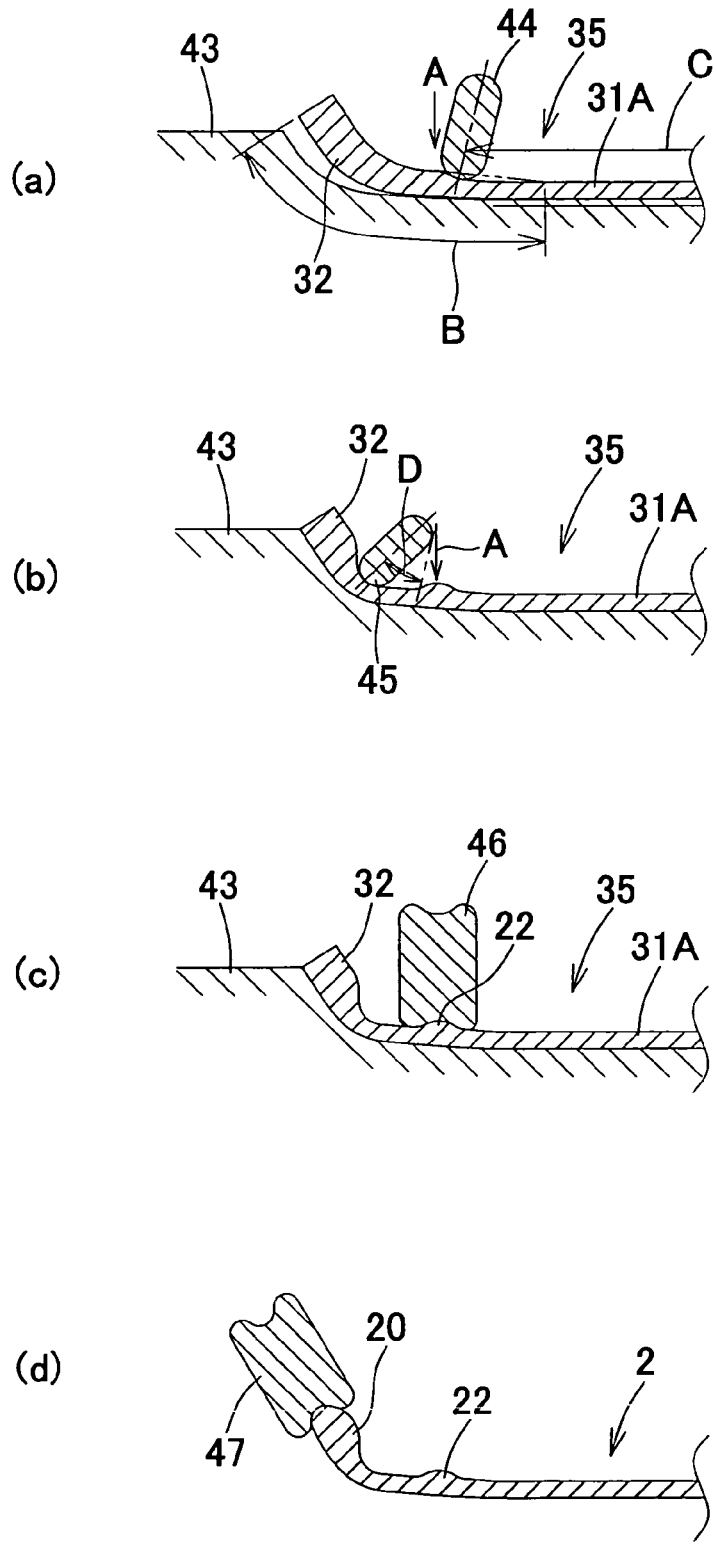
FIG. 5 is an explanatory diagram of the spinning step.

First, in the pressing step, as is shown in FIGS. 3A and 3B, a rolled metal plate 30 consisting of a material that is superior in terms of ductility such as an aluminum alloy or the like is press-molded using a die 40 and punch 41, thus producing a primary molded product 33 having the shape of a cylinder with a bottom, which has a flange part 32 that extends outward on one end part of a body part 31. In this case, the rolled metal plate 30 as a whole undergoes a reduction in diameter as a result of the central part being caused to protrude. During the period extending from the initiation of press-molding shown in FIG. 4A to the completion of press-molding shown in FIG. 4B, the outer circumferential part of the rolled metal plate 30 becomes thicker as a result of a segregation of thickness in the circumferential direction accompanying the reduction in diameter, so that the flange part 32 of the primary molded product 33 becomes thicker than the other parts. Furthermore, the thickness of the area in the vicinity of the flange part 32 of the primary molded product 33, i. e., the thickness of the curved part 33a between the flange part 32 and the body part 31 and the base part 33b of the body part 31 on the side of the flange part 32, becomes thicker as a result of damming during press-molding as the curvature radius R in the corner parts 42 of the punch insertion side end part of the die 40 is set at a larger value. Accordingly, by using an apparatus in which the curvature radius R in the corner parts 42 is set at an appropriate value and the clearance between the die 40 and punch 41 is set at a value that is slightly greater than the plate thickness of the rolled metal plate 30, it is possible to perform pressing so that the curved part 33a and base part 33b are also increased to a thickness that is 15 to 30% greater than the plate thickness of the rolled metal plate 30 accompanying the diameter reduction of the rolled metal plate 30 caused by press-molding. Thus, as a result of damming during the molding of the primary molded product 33, as is shown in FIGS. 4B and 5A, the flange part 32 and the area B in the vicinity of the flange part 32 become thicker moving toward the outer circumferential side of the flange part 32, and the molding position of the outer hump part 22 with respect to the body part 31 (i. e., the position indicated by the arrow A; hereafter referred to as the "molding position A") can be molded with a thickness that is equal to or greater than that of the outer hump part 22.

Furthermore, the curvature radius R of the corner parts 42 of the die 40 may be set at a uniform value; however, if this curvature radius is set so as to increase continuously or in stages toward the outer circumferential side of the corner parts 42, it is easier to achieve a segregation of thickness to the curved part 33a and base part 33b, so that the curved part 33a and base part 33b can easily be constructed with an increased thickness. Specifically, the curved part 33a and base part 33b can be constructed with an increased thickness by setting the curvature radius R1 of the corner parts 42 at a greater value than the curvature radius R2.

Next, in the cut-away step, as is shown in FIG. 3C, the bottom part 34 of the primary molded product 33 is removed by stamping or the like, thus producing a cylindrical secondary molded product 35 which has a flange part 32 and a body part 31A.

Next, in the spinning step, as is shown in FIG. 3D, using a mandrel 43 whose outer circumferential surface corresponding to the outer hump part 22 is formed into a flat circumferential surface, the secondary molded product 35 is externally mounted on this mandrel 43 so that the side of the flange part 32 is positioned on the design surface side, and spinning is performed on the secondary molded product 35 using rollers 44, 45 and 46 while rotating the wheel 1 together with the mandrel 43, thus molding the secondary molded product 35 into a rim shape by spinning.

In concrete terms, first, as is shown in FIG. 5A, in the range C up to the point immediately preceding the molding position A of the outer hump 22 from the end part of the secondary molded product 35 on the attachment surface side, the first roller 44 is moved while being pressed against the secondary molded product 35; furthermore, as is shown in FIG. 5B, in the range up to the point immediately preceding the molding position A of the outer hump 22 from an intermediate part of the flange part 32, the second roller 45 is moved while being pressed against the secondary molded product 35. Next, as is shown in FIG. 5C, the hump molding roller 46 that conforms to the outer surface shape of the outer hump part 22 molds the outer hump part 22 while being pressed against the secondary molded product 35. Here, since the molding position A of the outer hump part 22 in the secondary molded product 35, i. e., the portion on the side of the flange part 32 of the body part 31A of the secondary molded product 35, is constructed with a thickness that is equal to or somewhat greater than the thickness of the outer hump part 22 as a result of the damming in the manufacture of the primary molded product 33 as described above, an outer hump part 22 that protrudes outward as a result of thickness adjustment can be molded while constructing the inner circumferential surface side as a flat circumferential surface by pressing the hump molding roller 46 against this portion.

Furthermore, in this spinning step, as is shown in FIG. 5D, the outer rim flange part 20 can be molded by pressing the flange molding roller 47 that conforms to the outer surface of the outer rim flange part 20 against the end part on the design surface side of the secondary molded product 35. In other words, since the flange part 32 of the secondary molded product 35 is constructed with a thickness that is equal to or slightly greater than the thickness of the outer rim flange part 20 as a result of the damming during the manufacture of the primary molded product 33 as described above, a thick outer rim flange part 20 can be molded by pressing the flange molding roller 47 against this portion without applying any folding-back or curling to the end part on the design surface side of the secondary molded product 35.

The completed wheel 1 is obtained by thus manufacturing the rim 2, and fastening the disk 3 to an intermediate part of this rim 2 in the axial direction by welding.

Thus, in this manufacturing method, the plate thickness of the flange part 32 of the primary molded product 33, and the plate thickness in the curved part 33a and base part 33b in the vicinity of the flange part 32, can be constructed as a thickness that is 15 to 30% greater than the plate thickness of the rolled metal plate 30 by the simple construction of using a die 40 in which the curvature radius in the corner parts 42 of the end part on the insertion side of the punch 41 is appropriately set in the pressing step. Furthermore, the outer hump part 22 and outer rim flange part 20 can be molded on this thick portion in the spinning step; accordingly, the formation of indentations in the inner circumferential surface side with respect to the outer hump part 22 can be securely prevented, so that a deterioration in the external appearance of the wheel 1 caused by the exposure of such indentations on the outside can be prevented. Moreover, in regard to the outer rim flange part 20, the invasion of the interior of the outer rim flange part 20 by the plating liquid during plating can be securely prevented, so that corrosion of the outer rim flange part 20 by the plating liquid can be effectively prevented, while at the same time increasing the strength and rigidity of the wheel.

Furthermore, the present invention can be applied to a wheel 1 of arbitrary construction if this wheel is a wheel 1 in which the inner circumferential surface of the rim corresponding to the hump part disposed on the design surface side is exposed on the design surface side, and is constructed so that a rolled metal plate is press-molded into a cylindrical shape with a bottom during the manufacture of the rim.

Figure 6:
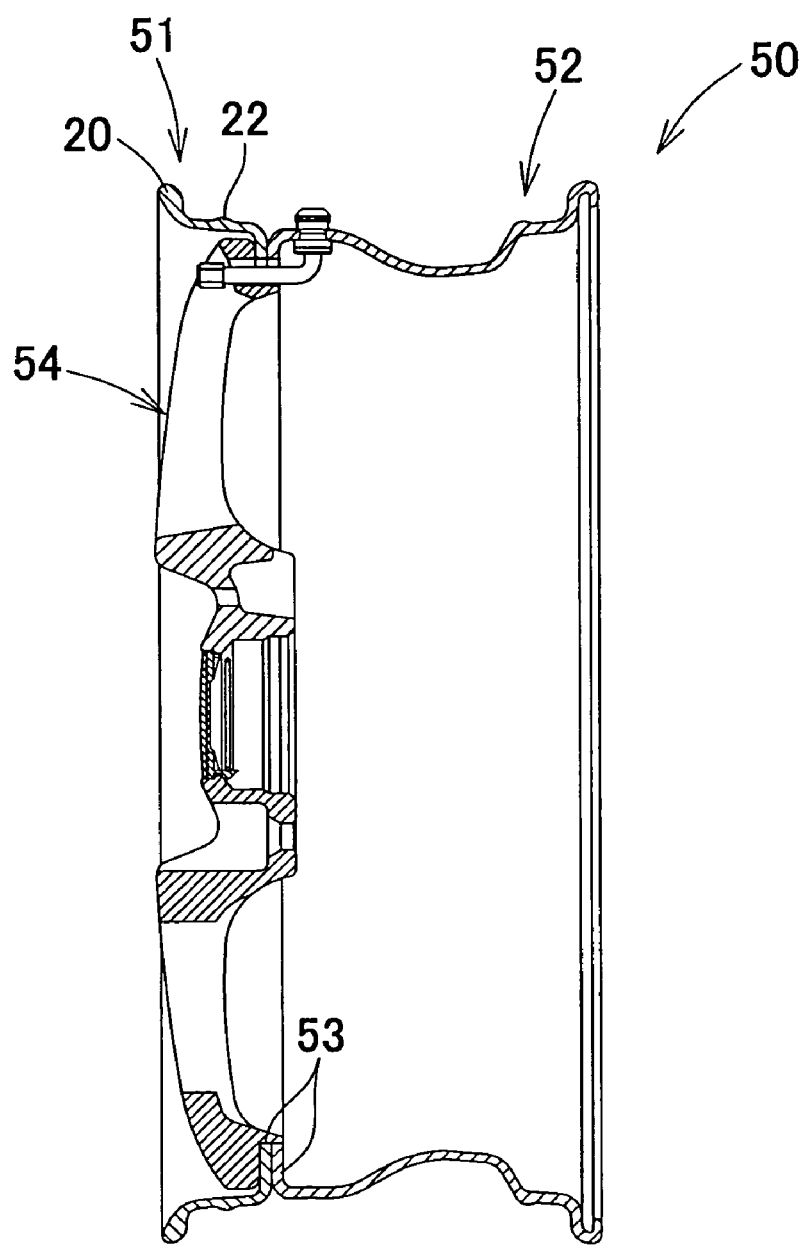
FIG. 6 is a longitudinal sectional view of a three-piece type wheel.

For example, in cases where the present invention is applied to a three-piece type wheel, as is shown in the vehicle wheel 50 illustrated in FIG. 6, the rim 2 in the abovementioned embodiment is split into an outer rim 51 and an inner rim 52, flange-form joining parts 53 are formed on one end part of each of the rims, i. e., the outer rim 51 and inner rim 52, a disk 54 is integrally joined to both rims 51 and 52 by bolts (not shown in the figures) at the joining parts 53, an outer rim flange part 20 which is constructed with a greater thickness than the other parts is formed by damming in the end part of the outer rim 51 on the design surface side, and an outer hump part 22 that protrudes outward in the radial direction is formed around the entire circumference by varying the thickness by damming in the vicinity of the end part of the outer rim 51 on the design surface side; furthermore, the inner circumferential surface side of the outer rim 51 of the outer hump 22 is formed into a flat circumferential surface.

When such a wheel 50 is manufactured, a primary molded product in which a rolled metal plate 30 is molded into a cylinder with a bottom using a die 40 and a punch 41 is manufactured in the pressing step in the same manner as in the abovementioned embodiment; next, in the cut-away step, the bottom part of the primary molded product is stamped out leaving the joining part 53 so that a secondary molded product is manufactured. Next, in the spinning step, an outer hump part 22 and outer rim flange part 20 are molded by performing spinning on the secondary molded product in the same manner as in the abovementioned embodiment. Next, the joining parts 53 of the outer rim 51 and inner rim 52 are superimposed, the outer circumferential part of the disk 54 is superimposed on the joining parts 53, and the disk 54 is integrally joined to both rims 51 and 52 by bolts to produce the wheel 50.

What is claimed is:

1. A wheel manufacturing method comprising a pressing step of press-molding a material plate consisting of a rolled metal plate using a die and punch to manufacture a primary molded product with a cylindrical shape having a bottom, which has a flange part that extends outward on one end part thereof, a cut-away step of cutting away the bottom part of the primary molded product to manufacture a cylindrical secondary molded product, and a spinning step of forming the secondary molded product into a rim shape by means of a roller, wherein the flange part and vicinity thereof of the primary molded product are formed to have an increased thickness by damming during press-molding by using a die in which the curvature radius in the corner parts of the punch insertion side end part is set so that the plate thickness of the flange part and vicinity thereof of the primary molded product is 15 to 30% greater than the plate thickness of the material plate in said press-molding step, and the secondary worked product is externally mounted on a mandrel so that the flange part is on the design surface side, and a hump molding roller is pressed against the increased-thickness portion of the secondary molded product to form a hump part, using a mandrel in which the outer circumferential surface corresponding to the hump part on at least the design surface side is formed into a flat circumferential surface, in said spinning process.

2. The wheel manufacturing method according to claim 1, wherein the curvature radius in the corner parts of said punch insertion end part is set so that this curvature radius increases either continuously or in stages toward the outer circumferential side of the corner parts.

3. The wheel manufacturing method according to claim 1 or 2, wherein the rim flange part is formed by pressing the flange molding roller against the end part of the flange part from the outside in said spinning step.

* * * * *